O. E. EDSTROM.
DETACHABLE WHEEL RIM.
APPLICATION FILED MAY 9, 1917.
1,286,173.
Patented Nov. 26, 1918.
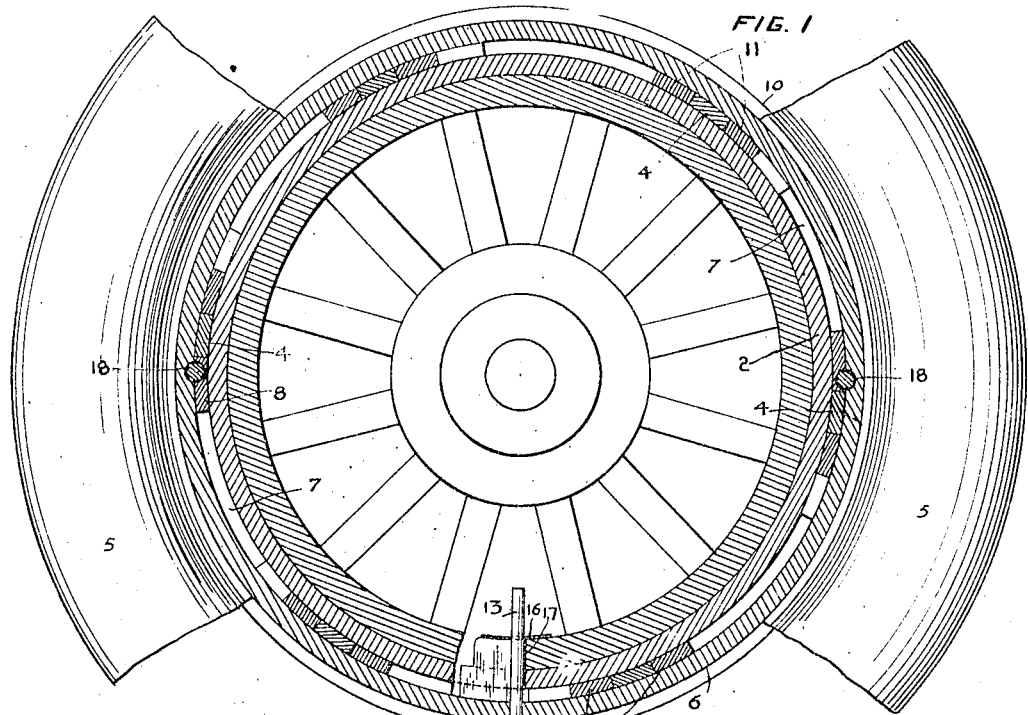
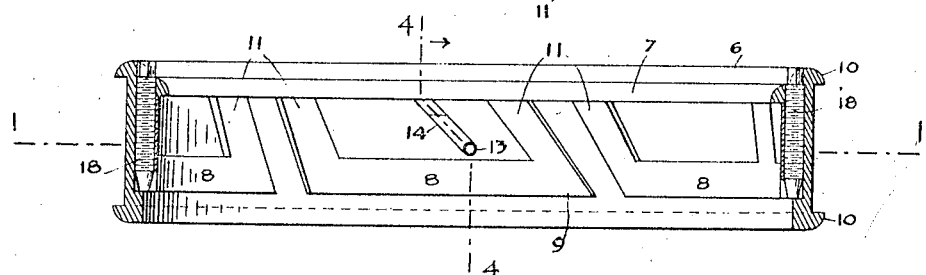
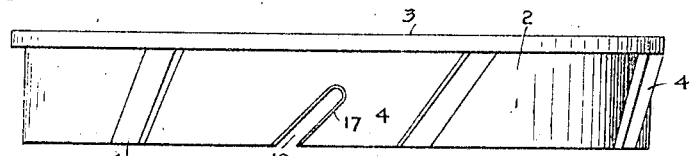
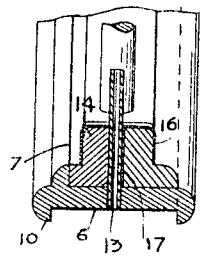
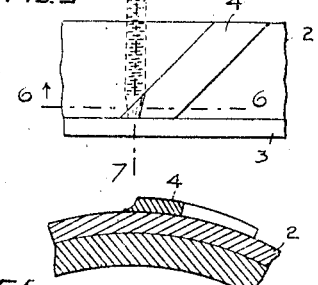
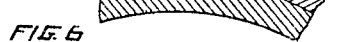
INVENTOR
OTTO E. EDSTROM
BY F. M. Wright,
ATT'Y

UNITED STATES PATENT OFFICE.

OTTO E. EDSTROM, OF OAKLAND, CALIFORNIA, ASSIGNOR TO RAPID REMOUNTABLE RIM COMPANY, OF SAN FRANCISCO, CALIFORNIA, A CORPORATION OF CALIFORNIA.

DETACHABLE WHEEL-RIM.

1,286,173.          Specification of Letters Patent.     Patented Nov. 26, 1918.

Application filed May 9, 1917.   Serial No. 167,533.

*To all whom it may concern:*

Be it known that I, OTTO E. EDSTROM, a citizen of the United States, residing at Oakland, in the county of Alameda and State of California, have invented new and useful Improvements in Detachable Wheel-Rims, of which the following is a specification.

The present invention relates to improvements in vehicle wheels, especially those equipped with pneumatic tires, the object of the invention being to provide a wheel having a rim carrying a pneumatic tire which can be quickly removed from the wheel and replaced thereon.

In the accompanying drawing, Figure 1 is a broken sectional view transverse to the axle of the wheel taken on the line 1—1 of Fig. 2; Fig. 2 is a broken plan view of the inner side of the rim of the wheel; Fig. 3 is a plan view of the felly rim of the wheel; Fig. 4 is a detail sectional view on the line 4—4 of Fig. 2; Fig. 5 is a broken detail front view of the felly rim; Fig. 6 is a sectional view on the line 6—6 of Fig. 5; Fig. 7 is a sectional view on the line 7—7 of Fig. 5.

Referring to the drawing, 1 indicates a vehicle wheel, of which the felly rim 2 has on one side an outwardly extending flange 3. On the outer surface of said felly rim, and flush with said flange, are secured ribs 4 extending obliquely across the felly rim at an angle of approximately 45° with the flange.

Slidable upon said felly rim is a rim 6 carrying a pneumatic tire 5 between external flanges 10 having on one side an inwardly extending flange 7. On the inner surface of said rim are secured guides 8, each comprising a circumferentially extending portion 9 and two oblique terminal portions 11, extending across the inner surface of the rim at the same obliquity as the ribs 4, the free ends of said oblique terminal portions abutting against the flange 7. The terminal portions of the adjacent guides are spaced from each other at a distance slightly greater than the width of the ribs 4, so as to form guideways for said ribs when the rim is slid upon the felly rim. Since said ribs and guideways extend obliquely to the felly and rim, it follows that the rim can only be slid upon the felly rim by being turned at the same time, or, in other words, by having a helical motion.

In the flangeless edge of the felly rim is formed a recess 12 extending into said felly rim with the same obliquity as the ribs 4, and, projecting through the rim, and extending inwardly therefrom, is an air tube 13, which, when the outer rim is moved helically around said inner rim, travels in the recess 12. Said air tube is strengthened by means of a casing 14 extending with the same obliquity from said tube to the flange 7, and being supported thereagainst, the front portion of said casing surrounding said tube in order to strengthen the same. Likewise, to reinforce the recess 12 there is secured about the inner portion and sides of the section of the felly rim containing said recess a thin shield or casing 16 having portions 17 lining the sides of said recess.

The tube 13 is so located in the rim that, when it enters the recess in the felly rim and moves thereinto, the ribs upon the felly rim also register with the guideways of the rim, and the rim can be slid upon the felly rim.

After the rim has been slid upon the felly rim with a helical motion, the flangeless edge of the felly rim abutting against the internal flange of the ring, it is secured in place by diametrically opposite set screws 18 screwed in an axial direction through the internal flange 7 of the felly rim and reinforcements 19 of the guideways adjacent thereto. The inner ends of these screws are conical, and, when the screws are sufficiently screwed in, said inner ends abut against a surface of said reinforcements which is beveled in two directions, so as not only to force the rim circumferentially around the felly rim but also to wedge it tightly thereon, and thus prevent any circumferential motion of the rim on the felly rim and therefore also any axial motion thereon.

The ribs and guides are so arranged that the running of the wheel tends to drive the rim still farther upon the felly rim.

The set screws are reduced and made angular at their outer ends in order to be operated upon by a tool having a square end, and the adjacent flange 7 is recessed to receive said end.

The method of removing and replacing the rim will be obvious from the foregoing description.

I claim:—

1. In a vehicle wheel, a felly, a fixed rim on the felly, a removable rim, one of said rims having oblique ribs formed thereon and the other rim guides for said ribs, and a screw carried by one of the rims having a tapering end adapted to engage one of the ribs to lock the removable rim against circumferential and lateral movement with relation to the fixed rim.

2. In a vehicle wheel, a felly, a fixed rim on the felly, a removable rim, one of said rims having oblique ribs formed thereon and the other rim guides for said ribs, annularly disposed guiding members interposed between the guides to guide the ribs into the guides formed for the reception of the ribs, and a screw carried by one of the rims having a tapering end adapted to engage one of the ribs to lock the removable rim against circumferential and lateral movement with relation to the fixed rim.

3. In a vehicle wheel, a felly rim, a removable rim thereon, one of said elements having oblique ribs and the other oblique guides for said ribs, and a screw carried by the removable rim having a tapering end adapted to engage one of the ribs to lock the rim against circumferential and lateral movement.

4. In a vehicle wheel, a felly, a fixed rim on the felly, a removable rim thereon, a plurality of interspaced angularly positioned wedge members formed on the fixed rim, said wedge members tapering from end to end both in width and depth, angularly positioned grooves formed in the removable rim also tapering from end to end both in width and depth to fit the wedge members, and a screw carried by the removable rim having a tapering end adapted to engage one of the wedge members to lock the removable rim against circumferential and lateral movement with relation to the fixed rim.

5. In a vehicle wheel, a felly, a fixed rim on the felly, a removable rim, one of said rims having oblique ribs formed thereon and the other rim guides for said ribs, a screw carried by one of the rims having a tapering end adapted to engage one of the ribs to lock the removable rim against circumferential and lateral movement with relation to the fixed rim, and an annular inwardly projecting flange formed on the removable rim adapted to engage the side of the felly to cover the ribs and guides formed on the ribs.

6. In a vehicle wheel, a felly, a fixed rim on the felly, a removable rim thereon, a plurality of interspaced angularly positioned wedge members formed on the fixed rim, said wedge members tapering from end to end both in width and depth, angularly positioned grooves formed in the removable rim also tapering from end to end both in width and depth to fit the wedge members, a horizontally positioned screw mounted in the removable rim, and a tapering extension on the inner end of said screw adapted to engage a cam face formed on a wedge member on the fixed rim to impart a circumferential movement to the removable rim to pull the rims together laterally and also positively lock said rims against circumferential and lateral movement when the screw is drawn up tight.

OTTO E. EDSTROM.